US012549896B2

(12) United States Patent
Birkenes et al.

(10) Patent No.: US 12,549,896 B2
(45) Date of Patent: Feb. 10, 2026

(54) AUDIO PROCESSING

(71) Applicant: Neatframe Limited, London (GB)

(72) Inventors: Øystein Birkenes, Oslo (NO); Lennart Burenius, Oslo (NO); Chiao-Ling Liao, Oslo (NO)

(73) Assignee: Neatframe Limited, London (GB)

( * ) Notice: Subject to any disclaimer, the term of this patent is extended or adjusted under 35 U.S.C. 154(b) by 155 days.

(21) Appl. No.: 18/273,218

(22) PCT Filed: Feb. 3, 2022

(86) PCT No.: PCT/EP2022/052641
§ 371 (c)(1),
(2) Date: Jul. 19, 2023

(87) PCT Pub. No.: WO2022/167553
PCT Pub. Date: Aug. 11, 2022

(65) Prior Publication Data

US 2024/0171907 A1 May 23, 2024

(30) Foreign Application Priority Data

Feb. 4, 2021 (GB) ........................................ 2101561
May 14, 2021 (GB) ........................................ 2106897

(51) Int. Cl.
*H04R 3/00* (2006.01)
*H04R 1/40* (2006.01)

(52) U.S. Cl.
CPC ............. *H04R 3/005* (2013.01); *H04R 1/406* (2013.01); *H04R 2430/01* (2013.01)

(58) Field of Classification Search
CPC .... H04R 3/005; H04R 1/406; H04R 2430/01; H04R 2227/001; H04R 2430/25;
(Continued)

(56) References Cited

U.S. PATENT DOCUMENTS

2012/0158404 A1 6/2012 Shin
2013/0343571 A1 12/2013 Rayala et al.
(Continued)

FOREIGN PATENT DOCUMENTS

WO WO 2012/109384 A1 8/2012
WO WO 2012109384 * 8/2012 ............. G10L 21/02

OTHER PUBLICATIONS

International Search Report and Written Opinion for International Application No. PCT/EP2022/052641, mailed Apr. 12, 2022.
(Continued)

*Primary Examiner* — Yosef K Laekemariam

(74) *Attorney, Agent, or Firm* — Wolf, Greenfield & Sacks, P.C.

(57) ABSTRACT

A computer-implemented method of processing an audio signal. The method comprises: receiving from two or more microphones, respective audio signals; deriving a plurality of time-frequency signals from the received audio signals, indexed by frequency, and for each of the time-frequency signals: determining in-beam components of the audio signals; and performing post-processing of the received audio signals, the post-processing comprising: computing a reference level based on the audio signals; computing an in-beam level based on the determined in-beam components of the audio-signals; computing a post-processing gain to be applied to the in-beam components from the reference level and in-beam level; and applying the post-processing gain to the in-beam components.

19 Claims, 9 Drawing Sheets

(58) Field of Classification Search
CPC ... H04R 3/00; H04R 1/40; G10L 2021/02166; G10L 21/0208
See application file for complete search history.

(56) References Cited

U.S. PATENT DOCUMENTS

| | | | |
|---|---|---|---|
| 2015/0214700 | A1 | 7/2015 | Bergeron et al. |
| 2017/0287499 | A1* | 10/2017 | Duong ................ G10L 21/0208 |
| 2018/0122399 | A1 | 5/2018 | Janse et al. |
| 2019/0287548 | A1 | 9/2019 | Sun et al. |

OTHER PUBLICATIONS

Li et al., A hybrid microphone array post-filter in a diffuse noise field. Applied Acoustics. Jun. 1, 2008;69(6):546-57.

Zhang et al., A compact-microphone-array-based speech enhancement algorithm using auditory subbands and probability constrained postfilter. 2008 Hands-Free Speech Communication and Microphone Arrays May 6, 2008:192-5.

* cited by examiner

AUDIO PROCESSING

CROSS-REFERENCE TO RELATED APPLICATIONS

This application is a National Stage filing under 35 U.S.C. § 371 of International Application Serial No. PCT/EP2022/052641, filed Feb. 3, 2022, which claims the benefit of priority to GB application number 2106897.8, filed May 14, 2021, and GB application number 2101561.5, filed Feb. 4, 2021, each of which is herein incorporated by reference in its entirety.

FIELD OF THE INVENTION

The present invention relates to a computer-implemented method, a server, a video-conferencing endpoint, and a non-transitory storage medium.

BACKGROUND

During video calls, acoustic noises such as kitchen noises, dogs barking, or interfering speech from other people who are not part of the call can be annoying and distracting to the call participants and disruptive to the meeting. This is especially true for noise sources which are not visible in the camera view, as the human auditory system is less capable of filtering out noises that are not simultaneously detected by the visual system.

An existing solution to this problem is to combine multiple microphone signals into a spatial filter (or beam-former) that is capable of filtering out acoustic signals coming from certain directions that are said to be out-of-beam, for example from outside the camera view. This technique works well for suppressing out-of-beam noise sources if the video system is used outdoors or in a very acoustically dry room i.e. one where acoustic reflections are extremely weak. However in the majority of rooms where a video conferencing system is used, an out-of-beam noise source will generate a plethora of acoustic reflections coming from directions which are in-beam. These in-beam reflections of the noise source are not filtered out by the spatial filter, and are therefore transmitted un-attenuated to the far-end participants. Thus, even with an ideal spatial filter, out-of-beam noises can still be transmitted and disrupt the video conference.

US 2016/0066092 A1 proposes approaching this issue by filtering source signals from an output based on directional-filter coefficients using a non-linear approach. Owens A., Efros A. A. (2018) Audio-Visual Scene Analysis with Self-Supervised Multisensory Features. In: Ferrari V., Hebert M., Sminchisescu C., Weiss Y. (eds) Computer Vision—ECCV 2018. ECCV 2018. Lecture Notes in Computer Science, vol 11210. Springer, Cham. proposes approaching this issue through the application of deep-learning based models.

SUMMARY

Accordingly, in a first aspect, embodiments of the invention provide a computer-implemented method of processing an audio signal, the method comprising:

- receiving from two or more microphones, respective audio signals;
- deriving a plurality of time-frequency signals from the received audio signals, indexed by frequency, and for each of the time-frequency signals:

- determining in-beam components of the audio signals; and
- performing post-processing of the received audio signals, the post-processing comprising:
  - computing a reference level based on the audio signals;
  - computing an in-beam level based on determined in-beam components of the audio-signals;
  - computing a post-processing gain to be applied to the in-beam components from the reference level and in-beam level; and
  - applying the post-processing gain to the in-beam components.

The above recited method allows out-of-beam noise sources to be suppressed, and so improves the intelligibility of the in-beam audio sources.

Optional features of the invention will now be set out. These are applicable singly or in any combination with any aspect of the invention.

The invention includes the combination of the aspects and preferred features described except where such a combination is clearly impermissible or expressly avoided.

Determining in-beam components of the audio signal may include applying a beam-forming process to the received audio signals. The beam-forming process may include estimating an in-beam signal as a linear combination of time-frequency signals from each of the plurality of microphones. The linear combination may take the form:

$$x_{IB}(t, f)=w_1(f)\cdot x_1(t, f)+w_2(f)\cdot x_2(t, f)+ \ldots w_n(f)\cdot x_n(t, f),$$

where $w_i$ are complex combination weights and $x_i(t, f)$ are time-frequency signals, one for each of n microphones.

In some examples, the in-beam signal $x_{IB}(t, f)$ (not necessarily calculated using the equation above) corresponds to the in-beam level, and therefore computing an in-beam level involves computing the in-beam signal and computing the post-processing gain can include utilising the in-beam level to calculate a further parameter for use in the post-processing gain. In other examples, the in-beam level is calculated using the in-beam signal $x_{IB}(t, f)$. Both variants are discussed in more detail below.

At least one microphone of the two or more microphones may be a unidirectional microphone, and another microphone of the two or more microphones may be an omnidirectional microphone, and determining in-beam components of the audio signals may include utilising the audio signals received by the unidirectional microphone as a spatial filter.

The microphones may be installed within a video-conferencing endpoint.

The reference level may be computed as:

$$L_{ref}(t,f)=\gamma\times|x_i(t,f)|^p+(1-\gamma)\times L_{ref}(t-1,f);$$

where γ is a smoothing factor, p is a positive number which may take a value of 1 or 2, and $x_i(t, f)$ is a time-frequency component resulting from the discrete Fourier transform of the received audio signals. The smoothing factor may take a value between 0 and 1 inclusive.

The in-beam level may be computed as:

$$L_{IB}(t,f)=\gamma\times|x_{IB}(t,f)|^p+(1-\gamma)\times L_{IB}(t-1,f);$$

where γ is a smoothing factor, p is a positive number which may take a value of 1 or 2, and $x_{IB}(t, f)$ is the in-beam time-frequency component resulting from the discrete Fourier transformer of the received audio signals. The smoothing factor may take a value between 0 and 1 inclusive.

The post-processing gain may be computed as:

$g(t,f)=L_{IB}(t,f)/L_{ref}(t,f).$

The method may further comprise applying a squashing function to the post-processing gain, such that the post-processing gain takes a value of at least 0 and no more than 1. The squashing function may utilise a threshold T, and may be take the form:

$h(s)=0 \text{ if } s<0$ $h(s)=\beta\cdot s^{\alpha} \text{ if } 0\le s\le T$ $h(s)=1 \text{ if } s>T$ where α and β are positive real values. In some examples, α=1 and β=1. In other examples the squashing function is an implementation of the generalised logistic function.

In a further example, when $L_{IB}(t, f)\le T\cdot L_{ref}(t, f)$ the post-processing gain is computed as:

$$g(t, f) = \beta\left(\frac{L_{IB}(t, f)}{L_{ref}(t, f)}\right)^{\alpha}$$

where α and β are positive real numbers, otherwise the post-processing gain is computed as:

$g(t,f)=1.$

Applying the post-processing gain to the in-beam components may include multiplying the post-processing gain by the in-beam components.

In a further example, the in-beam level may be used to compute a covariance, c(t, f), between the determined in-beam components of the audio-signals and the received audio signals and wherein the computed covariance is used to compute the post-processing gain. For example, the covariance may be computed as:

$c(t,f)=\gamma\times\overline{x_i(t,f)}\times x_{IB}(t,f)+(1-\gamma)\times C(t-1,f);$ where $x_i(t, f)$ is a reference time-frequency component resulting from the discrete Fourier transform of the received audio signals, $x_{IB}(t, f)$ is the in-beam time-frequency component resulting from the discrete Fourier transform of the received audio signals corresponding to the in-beam level, and $\overline{x_i(t,f)}$ is the complex conjugate of the reference time-frequency signal.

In this case, the post-processing gain may be computed as $g(t,f)=c(t,f)/L_{ref}(t,f).$ A squashing function may also be applied to this variant of the post-processing gain, such that the post-processing gain takes a value of at least 0 and no more than 1. Therefore, the post-processing gain is:

$$g(t, f) = h\left(\frac{c(t, f)}{L_{ref}(t, f)}\right)$$

where h(s) is the squashing function. For instance, using a threshold, T, as described for h(s) above. Using the covariance c(t, f) can improve the performance of the post-processing filter because the in-beam signal $x_{IB}(t, f)$ may be correlated with a received out-of-beam signal $x_{OB}(t, f)=x_i(t, f)-x_{IB}(t, f)$ which would be reflected in the covariance c(t, f).

Alternatively, the post-processing gain may be computed using a linear, or widely linear, filter. This may involve computing the post-processing gain using a pseudo-reference level and a pseudo-covariance. For example, the post-processing gain may be computed as:

$$g(t, f) = h\left(\frac{\left|g_0(t, f)\times x_{IB}(t, f) + g_1(t, f)\times\overline{x_{IB}(t, f)}\right|}{|x_{IB}(t, f)|}\right);$$

where $g_0(t, f)$ is computed as:

$$g_0(t, f) = \frac{L_{ref}(t, f)\times c(t, f) - \overline{L_{Pref}(t, f)}\times c_P(t, f)}{L_{ref}(t, f)^2 - |L_{Pref}(t, f)|^2};$$

$g_1(t, f)$ is computed as:

$$g_1(t, f) = \frac{L_{ref}(t, f)\times c_P(t, f) - L_{Pref}(t, f)\times c(t, f)}{L_{ref}(t, f)^2 - |L_{Pref}(t, f)|^2};$$

$L_{Pref}(t, f)$ is a pseudo-reference level, for example, computed as:

$L_{Pref}(t,f)=\gamma\times x_i(t,f)^2+(1-\gamma)\times L_{Pref}(t-1,f);$ $c_P(t, f)$ is a pseudo-covariance, for example, computed as:

$c_p(t,f)=\gamma\times x_i(t,f)\times x_{IB}(t,f)+(1-\gamma)\times c_P(t-1,f);$ and h is a squashing function, such that the post-processing gain takes a value between 0 and 1.

The method may further comprise computing a common gain factor from one or more of the plurality of time-frequency signals, and applying the common gain factor to one or more of the other time-frequency signals as the post-processing gain. Applying the common gain factor may include multiplying the common gain factor with the post-processing gain before applying the post-processing gain to one or more of the other time-frequency signals.

The method may further comprise taking as an input a frame of samples from the received audio signals and multiplying the frame with a window function. The method may further comprise transforming the windowed frame into the frequency domain through application of a discrete Fourier transform, the transformed audio signals comprises a plurality of time-frequency signals.

Determining in-beam components of the audio signals may include receiving, from a video camera, a visual field, and defining in-beam to be the spatial region corresponding to the visual field covered by the video camera.

In a second aspect, embodiments of the invention provide a server, comprising a processor and memory, the memory containing instructions which cause the processor to:

receive a plurality of audio signals;

derive a plurality of time-frequency signals from the received audio signals, indexed by frequency, and for each of the time-frequency signals:

determine in-beam components of the audio signals; and perform post-processing of the received audio signals, the post-processing comprising:

computing a reference level based on the audio signals;

computing an in-beam level based on the determined in-beam components of the audio-signals;

computing a post-processing gain to be applied to the in-beam components from the reference level and in-beam level; and applying the post-processing gain to the in-beam components.

The memory of the second aspect may contain machine executable instructions which, when executed by the processor, cause the processor to perform the method of the first aspect including any one, or any combination insofar as they are compatible, of the optional features set out with reference thereto.

In a third aspect, embodiments of the invention provide a video-conferencing endpoint, comprising:

a plurality of microphones;

a video camera;

a processor; and memory, wherein the memory contains machine executable instructions which, when executed on the processor cause the processor to:

receive respective audio signals from each microphone;

derive a plurality of time-frequency signals from the received audio signals, indexed by frequency, and for each of the time-frequency signals:

determine in-beam components of the audio signals; and perform post-processing of the received audio signals, the post-processing comprising:

computing a reference level based on the audio signals;

computing an in-beam level based on the determined in-beam components of the audio-signals;

computing a post-processing gain to be applied to the in-beam components from the reference level and in-beam level; and applying the post-processing gain to the in-beam components.

The memory of the third aspect may contain machine executable instructions which, when executed by the processor, cause the processor to perform the method of the first aspect including any one, or any combination insofar as they are compatible, of the optional features set out with reference thereto.

In a fourth aspect, embodiments of the invention provide a computer, containing a processor and memory, wherein the memory contains machine executable instructions which, when executed on the processor, cause the processor to perform the method of the first aspect including any one, or any combination insofar as they are compatible, of the optional features set out with reference thereto. The computer may be, for example, a video-conferencing end point and may be configured to receive a plurality of audio signals over a network.

Further aspects of the present invention provide: a computer program comprising code which, when run on a computer, causes the computer to perform the method of the first aspect; a computer readable medium storing a computer program comprising code which, when run on a computer, causes the computer to perform the method of the first aspect; and a computer system programmed to perform the method of the first aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
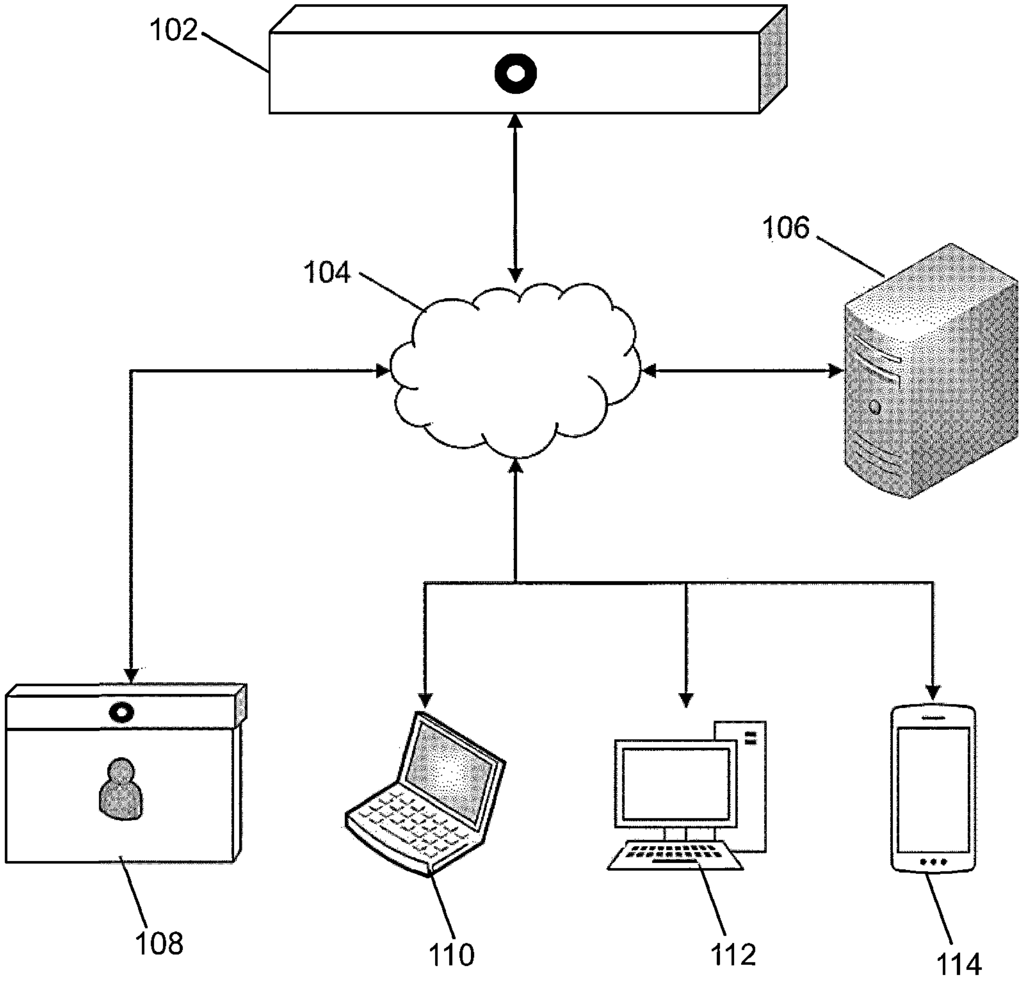
FIG. 1 shows a schematic of a computer network.

Aspects and embodiments of the present invention will now be discussed with reference to the accompanying figures. Further aspects and embodiments will be apparent to those skilled in the art. All documents mentioned in this text are incorporated herein by reference FIG. 1 shows a schematic of a computer network. The network includes a video conferencing end-point 102, which includes a plurality of microphones, a video camera, a processor, and memory. The memory includes machine executable instructions which cause the processor to perform certain operations as discussed in detail below. The endpoint 102 is connected to a network 104, which may be a wide area network or local area network. Also connected to the network is a server 106, a video-conferencing system 108, a laptop 110, a desktop 112, and a smart phone 114. The methods described herein are applicable to any of these devices. For example, audio captured by the microphones in the endpoint 102 may be transmitted to the server 106 for centralised processing according to the methods disclosed herein, before being transmitted to the receivers. Alternatively, the audio captured by the microphones can be sent directly to a recipient without the method being applied, the recipient (e.g. system 108, laptop 110, desktop 112, and/or smart phone 114) can then perform the method before outputting the processed audio signal through its local speakers.

Figure 2:
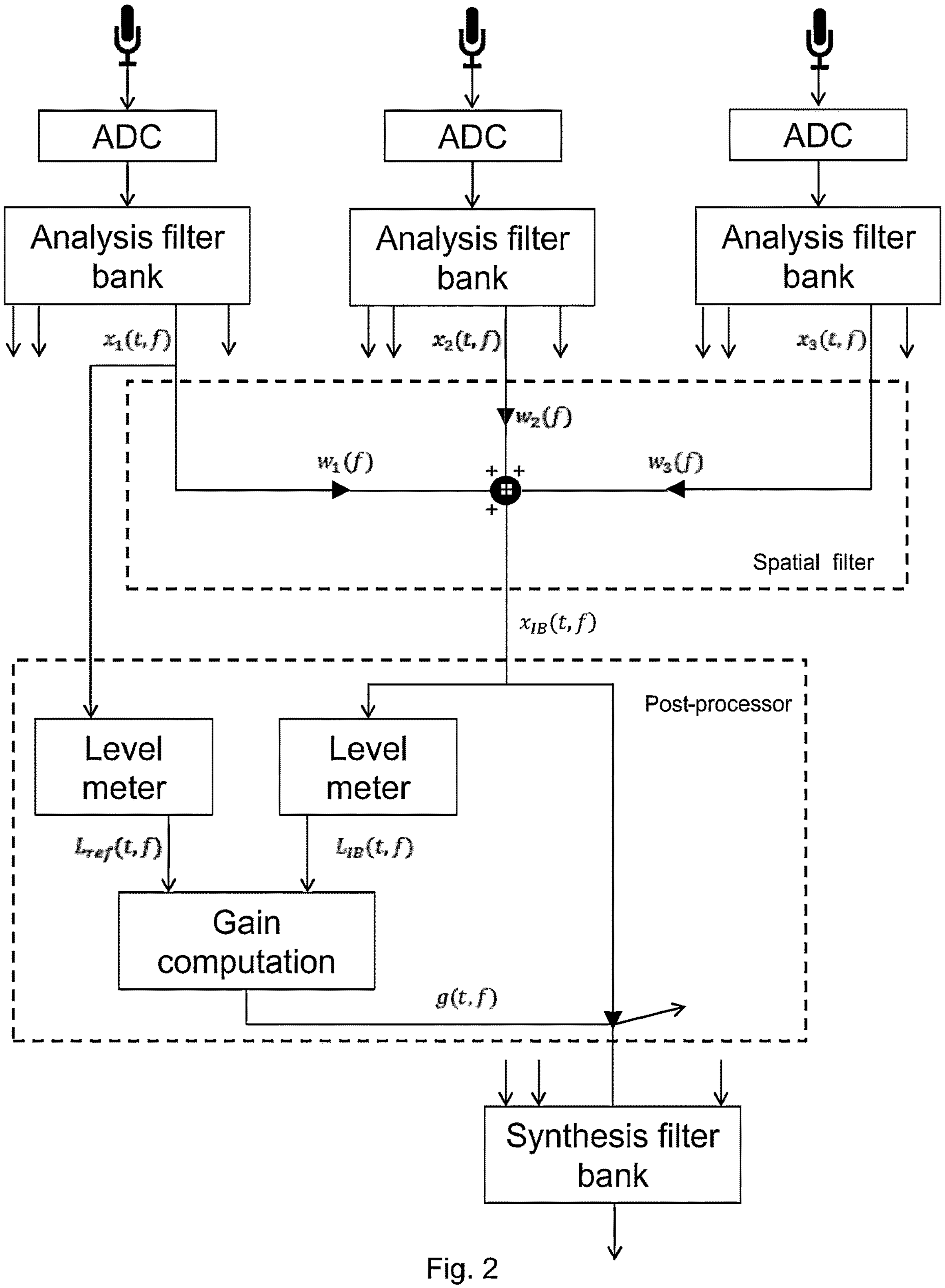
FIG. 2 is a signal flow diagram illustrating a method according to the present invention.

FIG. 2 is a signal flow diagram illustrating a method according to the present invention. For convenience only three microphones are shown but any numbers of microphones from two upwards can be used. In a first step, each analogue microphone signal is digitized using an analogue to digital converter (ADC). This means that each analogue signal is sampled in time with a chosen sampling frequency, such as 16 kHz, and each time sample is then quantized into a discrete set of values such that they can be represented by 32 bit floating point numbers. If digital microphones are used (i.e. ones incorporating their own ADCs) then discrete ADCs are not required.

Each digitized signal is then fed into an analysis filter bank. This filter bank transforms it into the time-frequency domain. More specifically, at regular intervals (such as every 10 ms) the analysis filter bank takes as input a frame of samples (e.g., 40 ms), multiples that frame with a window function (e.g. a Hann window function) and transforms the windowed frame into the frequency domain using a discrete Fourier transform (DFT). In other words, every 10 ms for example, each analysis filter bank outputs a set of N complex DFT coefficients (e.g. N=256). These coefficients can be interpreted as the amplitudes and phases of a sequence of frequency components ranging from 0 Hz to half the sampling frequency (the upper half of the frequencies are ignored as they do not contain any additional information). These signals are referred to as time-frequency signals and are denoted by: $x_1(t, f)$, $x_2(t, f)$, and $x_3(t, f)$, one for each microphone. t is the time frame index, which takes integer values e.g. 0, 1, 2 . . . , and f is the frequency index which takes integer values from 0, 1, . . . , N−1.

The time-frequency signal for each frequency index f is then processed independently of the other frequency indexes. Hence, for simplicity, FIG. 1 shows the signal flow graph for the processing applied to one frequency index f. However the signal flow graph for the other frequency indexes are equivalent.

For each frequency index f, a spatial filter is used to filter out sound signals coming from certain directions, which are referred to as out-of-beam directions. The out-of-beam directions are typically chosen to be the directions not visible in the camera view. The spatial filter computes an in-beam signal $x_{IB}(t, f)$ as a linear combination of the time-frequency signals for the microphones. The estimate of the in-beam for time index t and frequency index f is a linear combination of the time-frequency signals for all microphones, that is:

$$x_{IB}(t,f)=w_1(f)\cdot x_1(t,f)+w_2(f)\cdot x_2(t,f)+w_3(f)\cdot x_3(t,f)$$

where the complex combination weights $w_1(f)$, $w_2(f)$, and $w_3(f)$ are time independent and can be found using beamforming design approaches known per se in the art.

At this stage, the in-beam signal, which is the output of the spatial filter, may contain a significant amount of in-beam reflections generated by one or more out-of-beam sound sources. These unwanted reflections are filtered out by the post-processor which is discussed in detail below. After post-processing each frequency index f, a synthesis filter bank is used to transform the signals back into the time domain. This is the inverse operation of the analysis filter bank, which amounts to converting N complex DFT coefficients into a frame comprising, for example, 10 ms of samples.

The post-processor takes two time-frequency signals as inputs. The first is a reference signal, here chosen to be the first time-frequency signal $x_1(t, f)$, although any of the other time-frequency signals could instead be used as the reference signal. The second input is the in-beam signal $x_{IB}(t, f)$, which is the output of the spatial filter. For each of these two inputs, a level is computed using exponential smoothing. That is, the reference level is:

$$L_{ref}(t,f)=\gamma\cdot|x_1(t,f)|^p+(1-\gamma)\cdot L_{ref}(t-1,f)$$

where $\gamma$ is a smoothing factor and p is a positive number which may take a value of 1 or 2. $\gamma$ may take a value of between 0 and 1 inclusive. Similarly, the in-beam level in this example is $$L_{IB}(t,f)=\gamma\cdot|x_{IB}(t,f)|^p+(1-\gamma)\cdot L_{IB}(t-1,f)$$

Whilst in this example exponential smoothing has been used, instead a different formula could be used to compute the level such as a sample variance of a sliding window. For example, the last 1 ms of the samples. The reference level and in-beam level are then used to compute a post-processing gain g(t, f) which is to be applied to the in-beam signal $x_{IB}(t, f)$. This gain g(t, f) is a number between 0 and 1, where 0 indicates that the in-beam signal for the time index t and frequency index f is completely suppressed and 1 indicates that the in-beam signal for time index t and frequency index f is left un-attenuated. Therefore, ideally, the gain should be close to zero when the in-beam signal for a time index t and frequency index f is dominated by noisy reflections from an out-of-beam signal sound source and close to one when the in-beam signal for time index t and frequency index f is dominated by an in-beam sound source. In this way, if the time-frequency representation is appropriately chosen, out-of-beam sound sources will be heavily suppressed and in-beam sound sources will go through the post-processor largely un-attenuated. To provide this, an approximation to the Wiener filter can be used, which corresponds to the gain:

$$g(t,f)=\mathrm{SNR}(t,f)/(\mathrm{SNR}(t,f)+1)$$

Where SNR(t, f) is the estimated signal to noise ratio (SNR) at a time index t and frequency index f. This type of gain is known per se for conventional noise reduction, such as single-microphone spectral subtraction, where the stationary background signal is considered as noise and everything else considered as signal. In applying this to the present method however, different definitions are used: the in-beam signal $x_{IB}(t, f)$ is taken to be the signal and out-of-beam signal $x_{OB}(t, f)=x_1(t, f)-x_{IB}(t, f)$ is taken to be the noise. Substituting these definitions of signal and noise into the Wiener filter formula gives:

$$g(t,f)=L_{IB}(t,f)/L_{ref}(t,f)$$

Due to the way in which the two levels are computed, the ratio $L_{IB}(t, f)/L_{ref}(t, f)$ is not guaranteed to be less than or equal to one. For this reason, and in order to give more flexibility in tuning of the suppression performance, a squashing function h is applied to the ratio $L_{IB}(t, f)/L_{ref}(t, f)$ so that the final post-processing gain is given by:

$$g(t,f)=h(L_{IB}(t,f)/L_{ref}(t,f))$$

Here, the squashing function h is defined as a non-decreasing mapping from the set of real numbers to the set [0, 1]. An example of such a squashing function is as follows:

$$h(s)=0 \text{ if } s<0$$

$$h(s)=s \text{ if } s\geq 0 \text{ and } s\leq T$$

$$h(s)=1 \text{ if } s>T$$

where T≤1 is a positive threshold. This leads to the following formula for the post processing gain:

$$g(t,f)=\frac{L_{IB}(t,f)}{L_{ref}(t,f)} \text{ if } L_{IB}(t,f)\leq T\cdot L_{ref}(t,f)$$

$$g(t,f)=1, \text{ otherwise}$$

Figure 3:
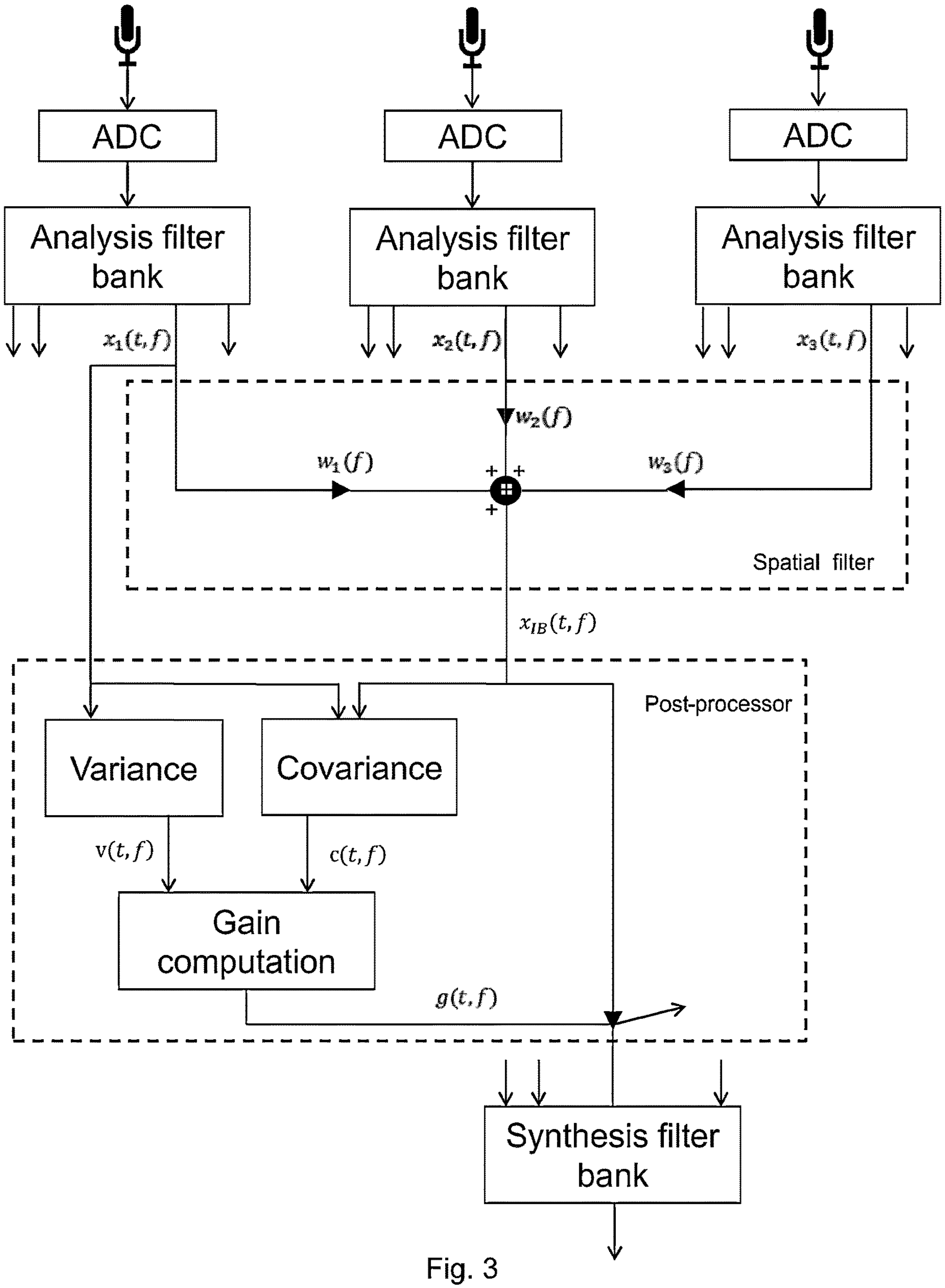
FIG. 3 is a signal flow diagram illustrating a variant method according to the present invention.

FIG. 3 shows a variant where the post-processing gain is calculated using an estimate of the short-time co-variance between an in-beam time-frequency signal and a reference time-frequency signal. The co-variance may also be considered as the cross-correlation between the in-beam time-frequency signal and a reference time-frequency signal. The co-variance between the two inputs is:

$$c(t,f)=\gamma\times\overline{x_i(t,f)}\times x_{IB}(t,f)+(1-\gamma)\times c(t-1,f);$$

where $x_{IB}(r, f)$ is the in-beam time frequency signal corresponding to the in-beam level in this example, $\gamma$ is a smoothing factor, $\overline{x_i(t,f)}$ is the complex conjugate of the reference time-frequency signal. $x_{IB}(t, f)$ and $x_i(t, f)$ are both assumed to have a mean of zero. The post-processing gain may be calculated as:

$$g(t,f)=h(c(t,f)/v(t,f))$$

Where v(t, f) is the short-time estimate of the co-variance of the reference signal with itself, which is the same as an estimate of the variance of the reference signal and is calculated using the same equation as for $L_{ref}(t, f)$ in the previous variant. Thus, the post-processing gain is:

$$g(t,f)=h(c(t,f)/L_{ref}(t,f)).$$

Whilst in this example exponential smoothing has been used, instead a different formula could be used to compute short-time co-variance such as a sample co-variance of a sliding window. For example, the last 1 ms of the samples.

Figure 4:
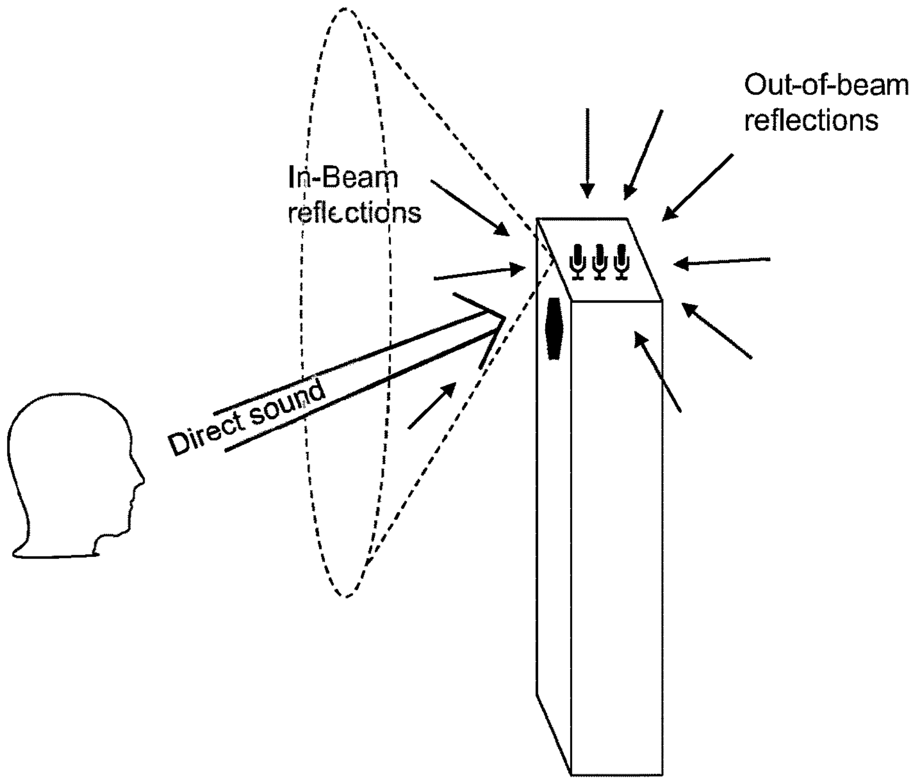
FIGS. 4-8 depict various scenarios and illustrate how the method is applied.

To demonstrate how the post-processing gain works, consider a spatial filter which creates a single beam in front of a video system and that T is set to 0.5. In the scenario shown in FIG. 4, the in-beam sound source is very close to the microphones. Therefore the microphone signals will be dominated by the in-beam direct sound and possibly its early reflections. All other reflections will be very small in comparison, including the out-of-beam reflections. This means that the spatial filter will pass almost all of the acoustic energy hitting the microphone array which again means that the in-beam level ($L_{IB}(t, f)$ or $x_{IB}(t, f)$) will be close to the reference level $L_{ref}(t, f)$, resulting in a post-processing gain equal to or close to 1.

Figure 5:
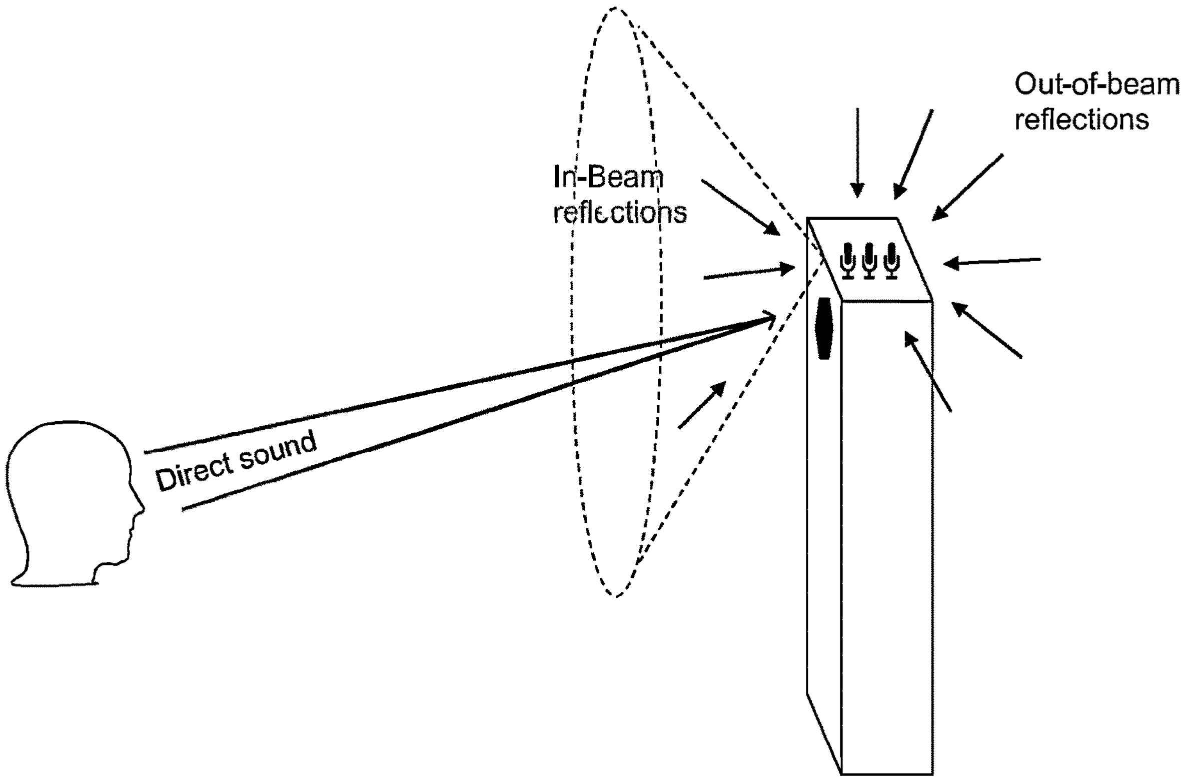

Turning now to the scenario shown in FIG. 5. The further the in-beam sound source moves from the microphone array, the weaker the direct sound and possibly its early reflections become. Therefore as the other reflections are not weakened to the same extent, a larger fraction of the energy hitting the microphone array is suppressed by the spatial filter and hence the in-beam level gets smaller relative to the reference level. Eventually, when the in-beam level has been reduced to half of the reference level, the post-processing gain drops from 1 to 0.5.

In other words, an in-beam sound source that is close to the video system is not attenuated by the post processor. But, beyond a certain distance from the video system, an in-beam sound source will be attenuated. This distance is determined at least in part by the room acoustics. An acoustically dry room will have a larger distance than a wet (e.g. highly reverberant) room.

Figure 6:
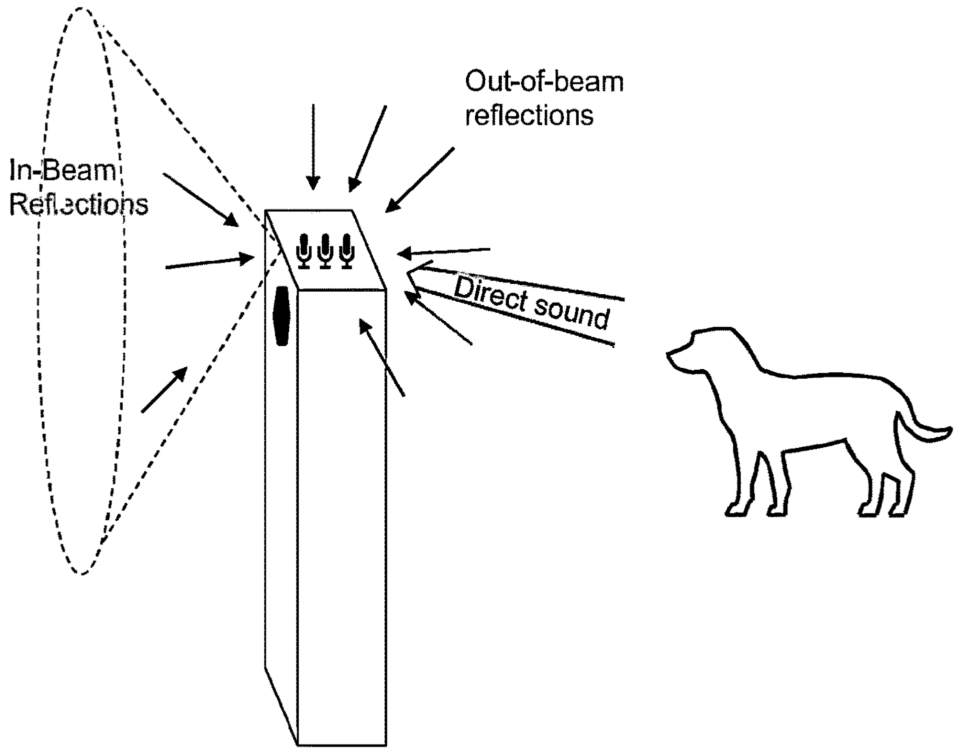
Figure 7:
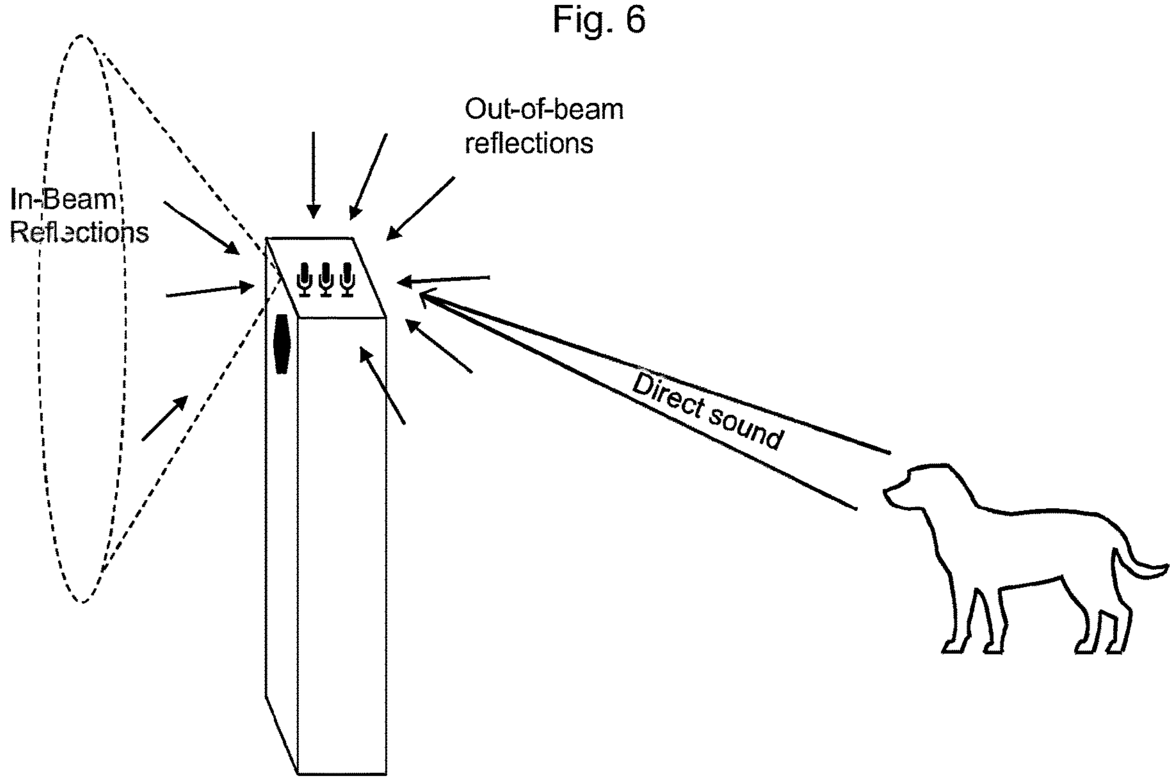

FIG. 6 considers a scenario in which the out-of-beam sound source is very close to the microphone array. The microphone signals will be dominated by the out-of-beam direct sound and possibly its early reflections. All other reflections will be very small in comparison, including the in-beam reflections. This means that the spatial filter suppresses almost all of the acoustic energy hitting the microphone array, which means that the in-beam level ($L_{IB}(t, f)$ or $x_{IB}(t, f)$) is much smaller than the reference level $L_{ref}(t, f)$ giving a post-processing gain close to 0. Turning now to the scenario in FIG. 7, the further the out-of-beam sound source moves away from the microphone array, the weaker the direct sound and possibly its early reflections become. Therefore, since the other reflections are not weakened to the same extent, a smaller fraction of the energy hitting the microphone array is suppressed by the spatial filter, and therefore the reference level gets smaller relative to the in-beam level. This means that the post-processing gain driven by $L_{IB}(t, f)/L_{ref}(t, f)$ or $c(t, f)/L_{ref}(t, f)$ increases from around 0 to a larger value (but typically never as large as 0.5).

In other words, an out-of-beam sound source that is close to the video system will be heavily attenuated by the post-processor. At larger distances, an out-of-beam sound source will still be attenuated, but not as much.

Figure 8:
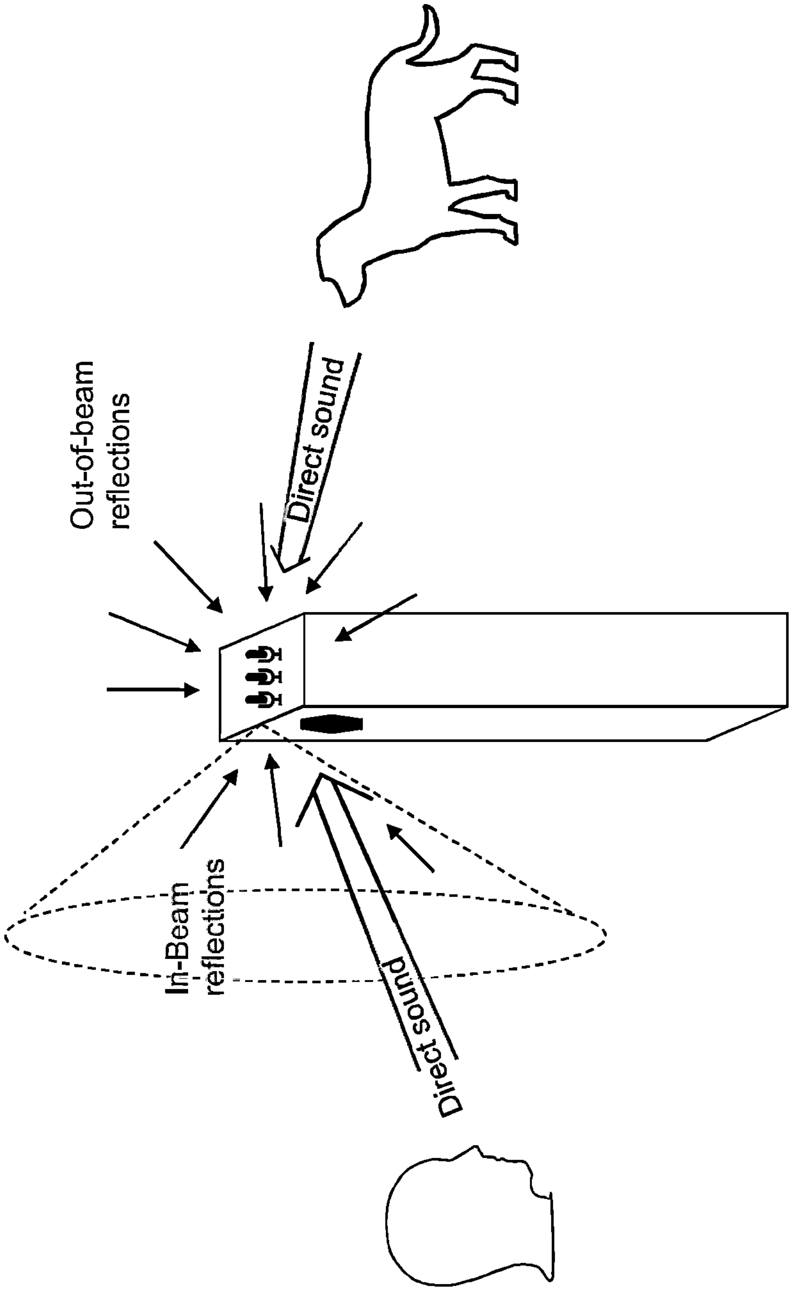

FIG. 8 shows a scenario in which there is both a close in-beam sound source and a close out-of-beam sound source. The time-frequency bins for which there is no or little overlap between the in-beam sound source and any of the out-of-beam sound sources will work as in the scenarios shown in FIGS. 4-7 discussed above. This means that the out-of-beam sound sources at some of the time-frequency bins will be attenuated by the post-processor, whilst the in-beam sound source at some of the time-frequency bins will go through the post-processor un-attenuated. For time-frequency bins where there is considerable overlap between the in-beam sound source and one or more of the out-of-beam sources, there is the Possibility that the post-processing gain will unintentionally attenuate the in-beam sound source or fail to attenuate all out-of-beam sound sources. However, if the time-frequency representation and the squashing function are chosen appropriately the overall experience will be a clear pick-up of the in-beam sound source and significant attenuation of any out-of-beam sound sources. In one example, a short-time Fourier transform filter bank with 40 ms frame length, 10 ms frame shift, and 512 coefficients (for a 16 kHz sampling frequency) was used. In addition to the squashing function h discussed above with threshold T set as 0.5.

The post-processing gain described above for a given frequency index f is computed based on the information available for that frequency index only. It is beneficial to have a good spatial filter for it to function well. Typically, it is difficult to design good spatial filters for very low and very high frequencies. This is because of the limited physical volume for microphone placement, and practical limitations on the number of microphones and their pairwise distances. Therefore an additional common gain factor can be computed from the frequency indexes which have a good spatial filter, and subsequently applied to the frequency indexes that do not have a good spatial filter. For example, the additional gain factor may be computed as:

$$g_{common}(t) = \frac{\sum_f (L_{IB}(t, f))}{\sum_f (L_{ref}(t, f)} \text{ if } \sum_f (L_{IB}(t, f)) \le T_{common} \cdot \sum_f (L_{ref}(t, f))$$

$$g_{common}(t) = 1, \text{ otherwise}$$

where $T_{common} \le 1$ is a positive threshold, and $\Sigma_f$ is a sum over all frequency indexes where a good spatial filter can be applied. If this additional factor is used, it is multiplied with the time-frequency gains g(t, f) before they are applied to the in-beam signals. This common gain factor can also serve as an effective way to further suppress out-of-beam sound sources whilst leaving in-beam sound sources un-attenuated.

These methods of post-processing allow through in-beam sound sources that are close to the microphone array whilst also significantly suppressing out-of-beam sound sources. The post-processor gain can be tuned to also significantly suppress in-beam sound sources which are far away from the microphone array. When applied to videoconferencing endpoints, the user will experience a bubble-shaped microphone pick-up pattern where the bubble extends from the microphone array and reaches out in front of the camera.

Figure 9:
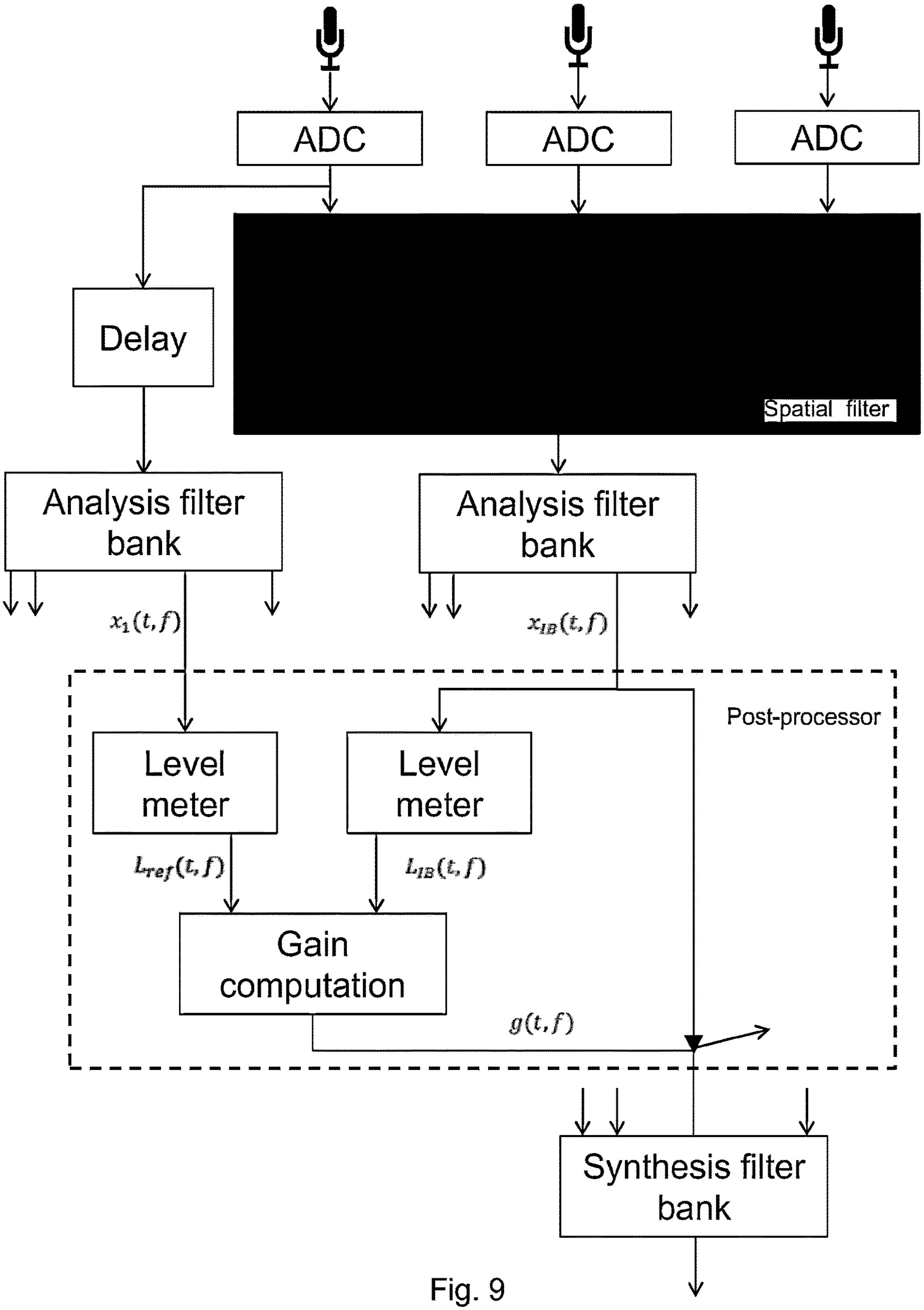
FIG. 9 is a signal flow diagram illustrating a variant method according to the present invention.

FIG. 9 is a signal flow diagram illustrating a variant method according to the present invention. Instead of applying the spatial filter to the time-frequency domain, as in FIG. 2, instead it is applied to the time domain. The time domain spatial filter is typically implemented as a filter and sum beam-former. A delay is then introduced to the reference signal in order to time-align it with the in-beam signal, before the post-processing is performed.

Figure 10:
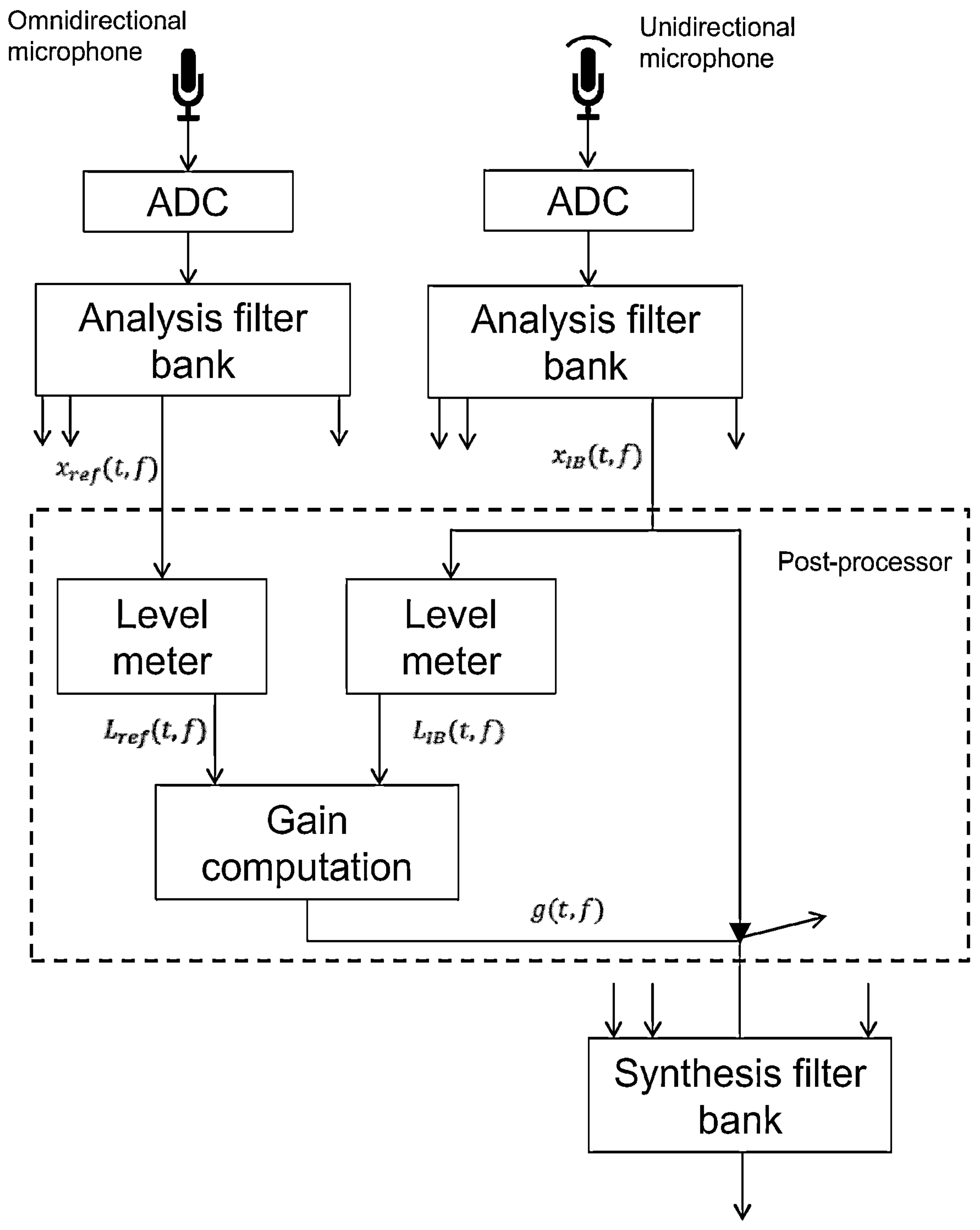
FIG. 10 is a signal flow diagram illustrating a further variant method according to the present invention.

FIG. 10 is a signal flow diagram illustrating a further variant method according to the present invention. Here the microphone array is replaced with a pair of microphones comprising: a unidirectional microphone and an omnidirectional microphone. In this variant, the unidirectional microphone signal serves as the spatial filter output and the omnidirectional microphone signal serves as the reference signal. Here, it is useful to locate the two microphones spatially close to one another and to ensure that the in-beam frequency responses are similar. If the in-beam frequency responses of the two microphones are not similar, an equalisation filter can be applied in order to make them similar. Further, as with the methods discussed above, the better the linear separation between the in-beam and out-of-beam signals, the better the post-processing will function.

Figure 11:
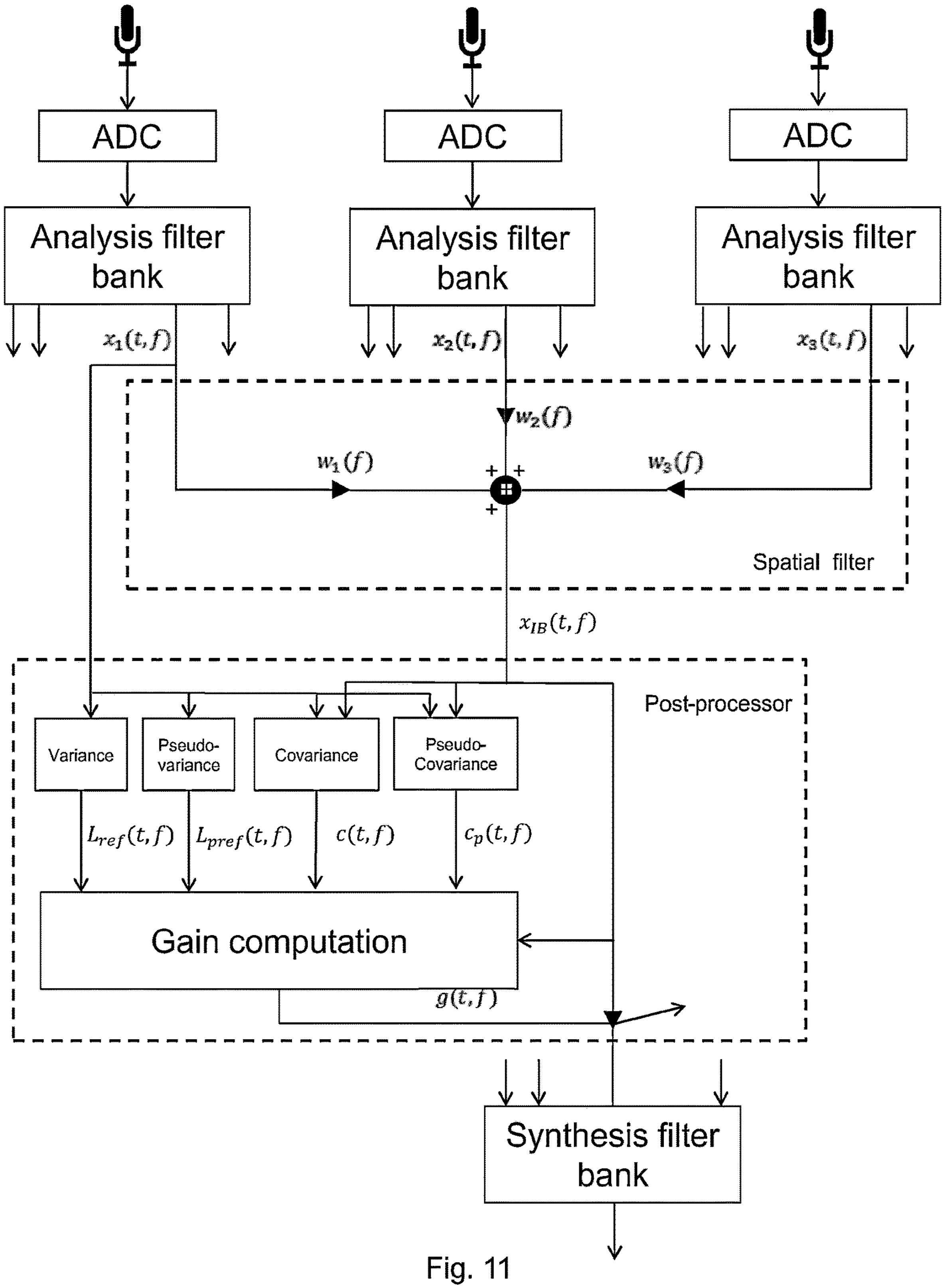
FIG. 11 is a signal flow diagram illustrating a further variant method according to the present invention.

FIG. 11 is a signal flow diagram illustrating a further variant method according to the present invention. Here the post-processing gain is computed based on a widely linear filter, for instance as described in B. Picinbono and P. Chevalier, "Widely linear estimation with complex data," IEEE Trans. Signal Processing, vol. 43, pp. 2030-2033, August 1995 (which is incorporated herein by reference in its entirety), instead of a Wiener filter which can offer improved performance. This involves computing the post-processing gain using a pseudo-reference level (also known as a pseudo-variance) and a pseudo-covariance. In this case, the post-processing gain is:

$$g(t, f) = h\left(\frac{\left|g_0(t, f)\times x_{IB}(t, f) + g_1(t, f)\times \overline{x_{IB}(t, f)}\right|}{|x_{IB}(t, f)|}\right);$$

where $\overline{y}$ is the complex conjugate of y, and $g_0(t, f)$ is computed as:

$$g_0(t, f) = \frac{L_{ref}(t, f)\times c(t, f) - \overline{L_{Pref}(t, f)}\times c_P(t, f)}{L_{ref}(t, f)^2 - |L_{Pref}(t, f)|^2};$$

$g_1(t, f)$ is computed as:

$$g_1(t, f) = \frac{L_{ref}(t, f)\times c_P(t, f) - L_{Pref}(t, f)\times c(t, f)}{L_{ref}(t, f)^2 - |L_{Pref}(t, f)|^2}.$$

$L_{Pref}(t, f)$ is the pseudo-reference level, for example, computed as:

$$L_{Pref}(t,f)=\gamma\times x_i(t,f)^2+(1-\gamma)\times L_{Pref}(t-1,f);$$

$c_P(t, f)$ is a pseudo-covariance, for example, computed as:

$$c_p(t,f)=\gamma\times x_i(t,f)\times x_{IB}(t,f)+(1-\gamma)\times c_P(t-1,f);$$

and h is a squashing function, such that the post-processing gain takes a value between 0 and 1. Alternatively, the post-processing gain may be computed as:

$$g(t, f) = h\left(\frac{\left|g_0(t, f)\times x_i(t, f) + g_1(t, f)\times \overline{x_i(t, f)}\right|}{|x_i(t, f)|}\right).$$

The features disclosed in the description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A computer-implemented method of processing an audio signal, the method comprising:

receiving from two or more microphones, respective audio signals;

deriving a plurality of time-frequency signals from the received audio signals, indexed by frequency, and for each of the time-frequency signals:

determining in-beam components of the received audio signals; and performing post-processing of the received audio signals, the post-processing comprising:

computing a reference level based on the received audio signals;

computing an in-beam level based on the determined in-beam components of the audio signals;

computing a post-processing gain to be applied to the in-beam components from the reference level and in-beam level; and applying the post-processing gain to the in-beam components, wherein the in-beam level is used to compute a covariance, c(t,f), between the determined in-beam components of the received audio signals and the received audio signals and wherein the computed covariance is used to compute the post-processing gain.

2. The computer-implemented method of claim 1, wherein determining in-beam components of the received audio signal includes applying a beam-forming process to the received audio signals.

3. The computer-implemented method of claim 2, wherein the beam-forming process includes estimating an in-beam signal as a linear combination of time-frequency signals from each of the plurality of microphones.

4. The computer-implemented method of claim 3, wherein the linear combination takes the form:

$$x_{IB}(t,f)=w_1(f)\cdot x_1(t,f)+w_2(f)\cdot x_2(t,f)+\ldots w_n(f)\cdot x_n(t,f)$$

where $w_i$ are complex combination weights.

5. The computer implemented method of claim 1, wherein at least one microphone of the two or more microphones is a unidirectional microphone, and another microphone of the two or more microphone is an omnidirectional microphone, and determining in-beam-components of the received audio signals includes utilising the received audio signals received by the unidirectional microphone as a spatial filter.

6. The computer-implemented method of claim 1, wherein the microphones are installed within a video-conferencing endpoint.

7. The computer-implemented method of claim 1, wherein the reference level is computed as:

$$L_{ref}(t,f)=\gamma\times|x_i(t,f)|^p+(1-\gamma)\times L_{ref}(t-1,f);$$

where $L_{ref}(t, f)$ is the reference level, $\gamma$ is a smoothing factor, p is a positive number, and $x_i(t, f)$ is a time-frequency component resulting from a discrete Fourier transform of the received audio signals.

8. The computer-implemented method of claim 1, wherein the in-beam level is computed as:

$$L_{IB}(t,f)=\gamma\times|x_{IB}(t,f)|^p+(1-\gamma)\times L_{IB}(t-1,f);$$

where $L_{IB}(t, f)$ is the in-beam level, $\gamma$ is a smoothing factor, p is a positive number, and $x_{IB}(t, f)$ is the in-beam time-frequency component resulting from a discrete Fourier transformer of the received audio signals.

9. The computer-implemented method of claim 1, wherein the post-processing gain is computed as:

$$g(t,f)=h\left(\frac{L_{IB}(t,f)}{L_{ref}(t,f)}\right),$$

where $L_{ref}(t, f)$ is the reference level, $L_{IB}(t, f)$ is the in-beam level, h is a squashing function, such that the post-processing gain takes a value between 0 and 1.

10. The computer-implemented method of claim 1, wherein the post-processing gain is computed using a widely linear filter.

11. The computer-implemented method of claim 1, wherein the post-processing gain is computed using a pseudo-reference level and a pseudo-covariance.

12. The computer-implemented method of claim 9, wherein the squashing function utilises a threshold T, such that when $L_{IB}(t, f)\leq T\cdot L_{ref}(t, f)$ the post-processing gain is computed as:

$$g(t,f)=\beta\left(\frac{L_{IB}(t,f)}{L_{ref}(t,f)}\right)^{\alpha}$$

where $L_{ref}(t, f)$ is the reference level, $L_{IB}(t, f)$ is the in-beam level, $\alpha$ and $\beta$ are positive real numbers, otherwise the post-processing gain is computed as:

$$g(t,f)=1.$$

13. The computer-implemented method of claim 1, wherein applying the post-processing gain to the in-beam components includes multiplying the post-processing gain by the in-beam components.

14. The computer-implemented method of claim 1, wherein the method further comprises computing a common gain factor from one or more of the plurality of time-frequency signals, and applying the common gain factor to one or more other time-frequency signals of the plurality of time-frequency signals as the post-processing gain.

15. The computer-implemented method of claim 1, wherein the method comprises taking as an input a frame of samples from the received audio signals and multiplying the frame with a window function.

16. The computer-implemented method of claim 15, wherein the method further comprises transforming the windowed frame into a frequency domain through application of a discrete Fourier transform, to obtain transformed audio signals comprising a plurality of time-frequency signals.

17. The computer-implemented method of claim 1, wherein determining in-beam components of the received audio signals includes receiving, from a video camera, a visual field, and defining in-beam to be a spatial region corresponding to the visual field covered by the video camera.

18. A server, comprising a processor and memory, the memory containing instructions which cause the processor to:

receive a plurality of audio signals;

derive a plurality of time-frequency signals from the received audio signals, indexed by frequency, and for each of the time-frequency signals:

determine in-beam components of the received audio signals; and perform post-processing of the received audio signals, the post-processing comprising:

computing a reference level based on the received audio signals;

computing an in-beam level based on the determined in-beam components of the received audio-signals;

computing a post-processing gain to be applied to the in-beam components from the reference level and in-beam level; and applying the post-processing gain to the in-beam components, wherein the in-beam level is used to compute a covariance, c(t,f), between the determined in-beam components of the received audio signals and the received audio signals and wherein the computed covariance is used to compute the post-processing gain.

19. A video-conferencing endpoint, comprising:

a plurality of microphones;

a video camera;

a processor; and memory, wherein the memory contains machine executable instructions which, when executed on the processor cause the processor to:

receive respective audio signals from each microphone;

derive a plurality of time-frequency signals from the received audio signals, indexed by frequency, and for each of the time-frequency signals:

determine in-beam components of the received audio signals; and perform post-processing of the received audio signals, the post-processing comprising:

computing a reference level based on the received audio signals;

computing an in-beam level based on the determined in-beam components of the received audio signals;

computing a post-processing gain to be applied to the in-beam components from the reference level and in-beam level; and applying the post-processing gain to the in-beam components, wherein the in-beam level is used to compute a covariance, c(t,f), between the determined in-beam components of the received audio signals and the received audio signals and wherein the computed covariance is used to compute the post-processing gain.

* * * * *